(12) United States Patent
Furusawa et al.

(10) Patent No.: US 8,657,502 B2
(45) Date of Patent: Feb. 25, 2014

(54) INNER RING OF WHEEL BEARING DEVICE, MANUFACTURING METHOD THEREFOR, AND WHEEL BEARING DEVICE

(75) Inventors: Shigeaki Furusawa, Yokohama (JP); Yutaka Koma, Hachioji (JP); Shinichi Okubo, Kashiwara (JP)

(73) Assignee: JTEKT Corporation, Osaka (JP)

( * ) Notice: Subject to any disclaimer, the term of this patent is extended or adjusted under 35 U.S.C. 154(b) by 219 days.

(21) Appl. No.: 12/965,129

(22) Filed: Dec. 10, 2010

(65) Prior Publication Data
US 2011/0158571 A1    Jun. 30, 2011

(30) Foreign Application Priority Data
Dec. 25, 2009    (JP) .................. 2009-294351

(51) Int. Cl.
| | |
|---|---|
| F16C 32/00 | (2006.01) |
| F16C 33/58 | (2006.01) |
| F16C 13/00 | (2006.01) |
| B21D 53/10 | (2006.01) |

(52) U.S. Cl.
USPC ....... 384/448; 384/544; 384/513; 29/898.066

(58) Field of Classification Search
USPC ........... 29/898.13, 898.06, 898.063; 384/488, 384/544, 589, 446, 447, 477, 561, 569, 571, 384/572, 577, 625
See application file for complete search history.

(56) References Cited

U.S. PATENT DOCUMENTS

| | | | | |
|---|---|---|---|---|
| 5,997,182 A | * | 12/1999 | Brown | 384/448 |
| 6,428,214 B2 | * | 8/2002 | Tajima et al. | 384/544 |
| 7,338,211 B2 | * | 3/2008 | Bianco et al. | 384/448 |

FOREIGN PATENT DOCUMENTS

| | | |
|---|---|---|
| JP | A-06-304616 | 1/1994 |
| JP | A 2007-192281 | 8/2007 |
| JP | A-2008-082483 | 4/2008 |

OTHER PUBLICATIONS

Sep. 25, 2013 Office Action issued in Japanese Patent Application No. 2009-294351 (with English Translation).

* cited by examiner

*Primary Examiner* — Alan B Waits
(74) *Attorney, Agent, or Firm* — Oliff PLC

(57) ABSTRACT

An inner ring of a wheel bearing device has a ring mounting surface on which a pulsar ring for detecting a rotation speed of an axle is mounted and first and second inner raceway surfaces which are arranged along an axis of the axle and on which rolling elements roll. The inner ring includes a first inner ring member that has the first inner raceway surface and the ring mounting surface and a second inner ring member that has the second inner raceway surface and a portion that is spaced apart in an axial direction from the second inner raceway surface toward one side at a distance that is longer than or equal to a distance in the axial direction between the first inner raceway surface and the ring mounting surface. A diameter of the portion is smaller than a diameter of the ring mounting surface.

9 Claims, 4 Drawing Sheets

INNER RING OF WHEEL BEARING DEVICE, MANUFACTURING METHOD THEREFOR, AND WHEEL BEARING DEVICE

INCORPORATION BY REFERENCE

The disclosure of Japanese Patent Application No. 2009-294351 filed on Dec. 25, 2009, including the specification, drawings and abstract, is incorporated herein by reference in its entirety.

BACKGROUND OF THE INVENTION

1. Field of the Invention

The invention relates generally to an inner ring of a wheel bearing device, a manufacturing method therefor, and a wheel bearing device and, more particularly to an inner ring of a wheel bearing device that supports a wheel of an automobile, or the like, such that the wheel is rotatable with respect to a suspension, a manufacturing method therefor, and a wheel bearing device.

2. Description of the Related Art

There is an existing wheel bearing device that includes an inner member, an outer member, and double row rolling elements. The inner member rotates together with a constant velocity joint coupled to a drive shaft. The outer member is arranged around the outer periphery of the inner member, and is fixed to a knuckle of a suspension that supports a wheel of a vehicle. The double row rolling elements are interposed between the outer member and the inner member (for example, see Japanese Patent Application Publication No. 2007-192281 (JP-A-2007-192281)).

The bearing device described in JP-A-2007-192281 has the double row rolling elements interposed between the outer member and the inner member. A pulsar ring facing a sensor for anti-lock brake system (ABS) is arranged at a location between these double row rolling elements in the axial direction. The inner member is formed of two separate members that are arranged next to each other in the axial direction, and the pulsar ring is fitted around the outer periphery of one of these two members. In addition, the ABS sensor is attached to the outer member.

SUMMARY OF INVENTION

It is an object of the invention to provide an inner ring of a wheel bearing device, a manufacturing method therefor and a wheel bearing device with which the size of a grinding device is made smaller and the machining cost is made lower as compared to the case where a raceway surface of an inner ring of a wheel bearing device and a portion to which a pulsar ring is fitted are ground with different grinding wheels.

An aspect of the invention relates to an inner ring of a wheel bearing device that rotatably supports an axle. The inner ring includes a first inner ring member, and a second inner ring member. The first inner ring member has a first inner raceway surface on which wheel-side rolling elements among double row rolling elements roll, and a ring mounting surface which is beside the first inner raceway surface in an axial direction and on which a rotation speed detecting ring for detecting a rotation speed of the axle is mounted. The second inner ring member is arranged along an axis of the first inner ring member and has a second inner raceway surface on which vehicle body-side rolling elements among the double row rolling elements roll and an end portion that is spaced apart from the second inner raceway surface toward a wheel-side in the axial direction and that contacts an end surface of the ring mounting surface. An outside diameter of the end portion is smaller than an outside diameter of the ring mounting surface.

BRIEF DESCRIPTION OF DRAWINGS

The foregoing and further features and advantages of the invention will become apparent from the following description of example embodiments with reference to the accompanying drawings, wherein like numerals are used to represent like elements and wherein:

FIG. 3A and FIG. 3B are sectional views that illustrate a manufacturing method for the inner ring of the wheel bearing device according to the embodiment of the invention, wherein FIG. 3A shows the process of forming a first inner ring member that is on the wheel-side and FIG. 3B shows the process of forming a second inner ring member that is on the vehicle body-side.

DETAILED DESCRIPTION OF EMBODIMENTS

Hereinafter, an inner ring of a wheel bearing device, a manufacturing method therefor and a wheel bearing device according to an embodiment of the invention will be described with reference to the accompanying drawings.

Figure 1:
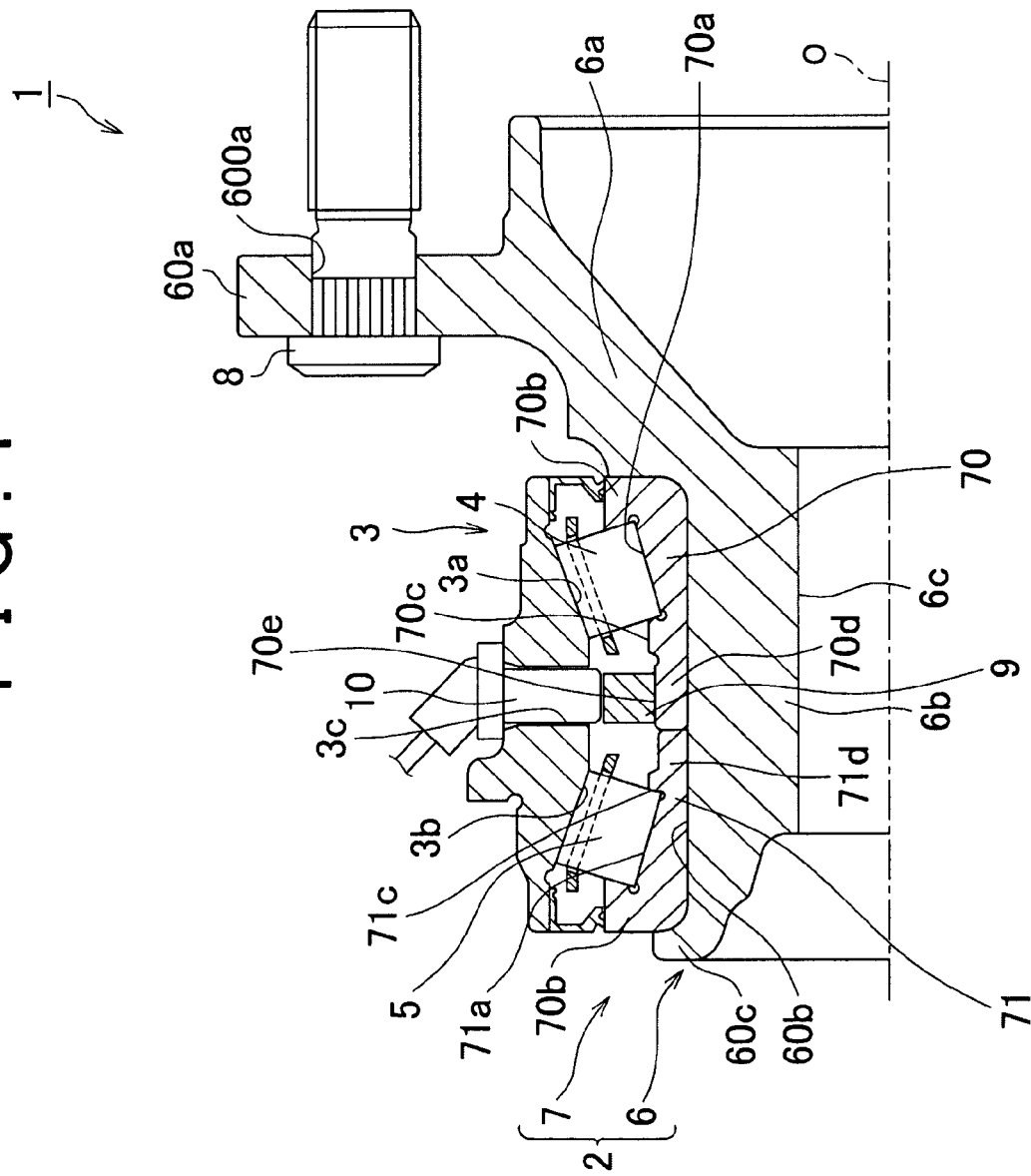
FIG. 1 is a sectional view that illustrates the entirety of a wheel bearing device to which an inner ring according to an embodiment of the invention is applied.
Figure 2:
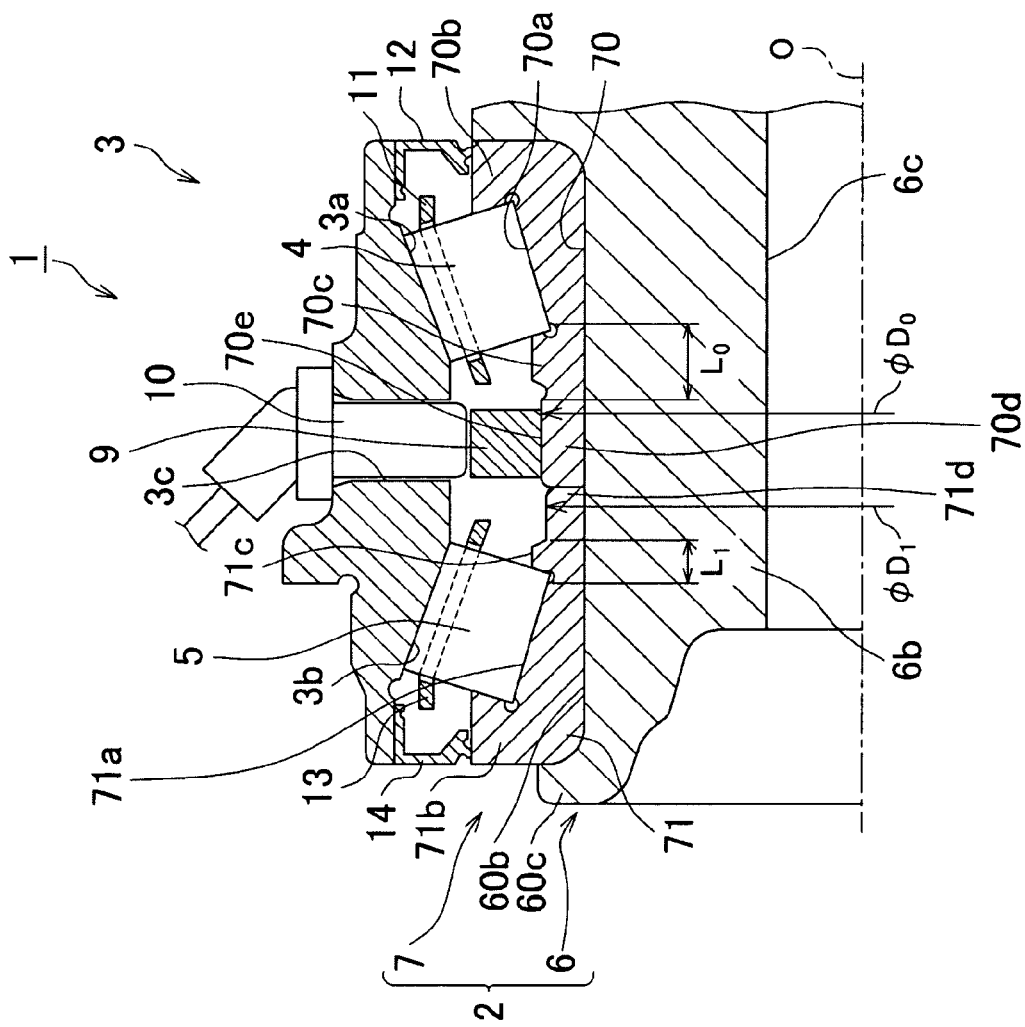
FIG. 2 is a sectional view that illustrates a main portion of the wheel bearing device to which the inner ring according to the embodiment of the invention is applied.

The overall configuration of the wheel bearing device according to the embodiment will be described below. FIG. 1 shows the entirety of the wheel bearing device. FIG. 2 shows a main portion of the wheel bearing device. As shown in FIG. 1, the wheel bearing device 1 includes an inner member 2, an outer member 3 and double row rolling elements 4 and 5. The inner member 2 is rotatable about a central axis O of the wheel bearing device 1. The outer member 3 is arranged around the outer periphery of the inner member 2. The double row rolling elements 4 and 5 are interposed between the outer member 3 and the inner member 2. The wheel bearing device 1 is arranged between a vehicle body (not shown) and a wheel (not shown).

The configuration of the inner member 2 will be described below. As shown in FIG. 1, the inner member 2 has a hub spindle 6 and an inner ring 7, and is arranged rotatably about the central axis O.

The hub spindle 6 has two large and small drum portions 6a and 6b having different outside diameters, and is coupled to a drive shaft (not shown) via a constant velocity universal joint (not shown), or the like, such that torque is transmittable. The hub spindle 6 is fastened to the drive shaft (not shown) with a nut, and is made of, for example, medium carbon steel. The hub spindle 6 has a through-hole 6c that extends along the central axis O and opens at both axial ends of the hub spindle 6. The inner periphery of the hub spindle 6, which defines the through-hole 6c, has a serration (not shown) for coupling a stem (not shown) of the constant velocity universal joint such that the relative rotation of the stem is not permitted.

The large-diameter drum portion 6a is arranged in a wheel-side (right side in FIG. 1) of the hub spindle 6. The large-diameter drum portion 6a integrally has an annular wheel mounting flange 60a that extends radially outward and is used for mounting of the wheel (not shown). The wheel mounting flange 60a has a plurality of bolt insertion holes 600a (only one of them is shown in the drawing), which are arranged in the circumferential direction and through which hub bolts 8 are passed.

The small-diameter drum portion 6b has an annular small-diameter portion 60b on its outer peripheral surface for mounting of an inner ring 7, and is arranged on a vehicle body-side (left side in FIG. 1) with respect to the drum portion 6a of the hub spindle 6.

On the other hand, the inner ring 7 has a first inner ring member 70 and a second inner ring member 71 that are separate members arranged next to each other in the direction along the central axis O. The inner ring 7 is fixed to the outer peripheral surface of the small-diameter portion 60b of the hub spindle 6, and is formed, for example, of a cylindrical compact made of bearing steel.

The first inner ring member 70 has a first inner raceway surface 70a, a first shoulder portion 70b, a first small-diameter rib portion 70c and a first end portion 70d. Rolling elements 4 arranged on the wheel-side roll on the first inner raceway surface 70a. The first shoulder portion 70b is formed integrally with a wheel-side end of the first inner raceway surface 70a. The first small-diameter rib portion 70c is formed integrally with a vehicle body-side end of the first inner raceway surface 70a. The first end portion 70d is formed integrally with a vehicle body-side end of the first small-diameter rib portion 70c.

The first inner ring raceway surface 70a has a conical surface shape such that the outside diameter is set so as to gradually increase from the vehicle body-side toward the wheel-side. An annular recessed groove is formed in the conical surface of the outer peripheral portion of the first inner ring member 70, whereby the first inner raceway surface 70a is formed on the bottom of the groove.

The outside diameter of the first small-diameter rib portion 70c is larger than each of the minimum outside diameter of the first inner raceway surface 70a and the outside diameter of the first end portion 70d. A ring mounting surface 70e is formed in the outer peripheral portion of the first end portion 70d. A pulsar ring 9 that serves as a rotation speed detecting ring is press-fitted on the ring mounting surface 70e. The ring mounting surface 70e is ground at the same time as the first inner raceway surface 70a.

Recesses and protrusions (not shown) are formed in the outer peripheral portion of the pulsar ring 9 alternately in the circumferential direction. The pulsar ring 9 is formed of sintered metal made with the use of, for example, ferritic stainless steel powder.

The second inner ring member 71 has a second inner raceway surface 71a, a second shoulder portion 71b, a second small-diameter rib portion 71c and a second end portion 71d. Rolling elements 5 arranged on the vehicle body-side roll on the second inner raceway surface 71a. The second shoulder portion 71b is formed integrally with a vehicle body-side end of the second inner raceway surface 71a. The second small-diameter rib portion 71c is formed integrally with the wheel-side end of the second inner raceway surface 71a. The second end portion 71d is formed integrally with the wheel-side end of the second small-diameter rib portion 71c.

The second inner raceway surface 71a has a conical surface shape such that the outside diameter is set so as to gradually reduce from the vehicle body-side toward the wheel-side. An annular recessed groove is formed in the conical surface of the outer peripheral portion of the second inner ring member 71, whereby the second inner raceway surface 71a is formed on the bottom of the groove. The outside diameter of the second small-diameter rib portion 71c is larger than each of the minimum outside diameter of the second inner raceway surface 71a and the outside diameter of the second end portion 71d.

The first inner ring member 70 and the second inner ring member 71 are fitted around the small-diameter portion 60b of the hub spindle 6 such that the vehicle body-side end surface of the first end portion 70d is in contact with the wheel-side end surface of the second end portion 71d. In addition, the axial positions of the first inner ring member 70 and second inner ring member 71 are fixed with respect to the hub spindle 6 by a calking portion 60c formed at a vehicle body-side end portion of the small-diameter portion 60b.

In addition, an axial distance $L_1$ between the wheel-side end portion of the second inner raceway surface 71a and the vehicle body-side end portion of the second end portion 71d is set to be shorter than an axial distance $L_0$ between the vehicle body-side end portion of the first inner ring raceway surface 70a and the wheel-side end portion of the first end portion 70d ($L_0 > L_1$). Furthermore, the outside diameter $D_1$ of the second end portion 71d is set to be smaller than the outside diameter $D_0$ of the first end portion 70d (that is, the diameter of the ring mounting surface 70e) ($D_0 > D_1$).

The configuration of the outer member 3 will be described below. As shown in FIG. 1, the outer member 3 has outer raceway surfaces 3a and 3b on which the double row rolling elements 4 and 5 respectively roll. The outer member 3 is fixed to a vehicle body-side member via a knuckle (not shown) that serves as a component of a suspension (not shown). The entirety of the outer member 3 is formed of a cylindrical compact that is made of, for example, medium carbon steel, and that extends along the central axis O and opens at both axial ends. Then, the outer member 3 is configured to function as an outer ring of the wheel bearing device 1.

The outer member 3 has a sensor mounting hole 3c that is open at the inner and outer peripheral surfaces thereof and that is used for mounting of an ABS sensor 10. The ABS sensor 10 is fixed in the sensor mounting hole 3c, and a detecting portion of the ABS sensor 10 is arranged at a location facing the outer peripheral surface of the pulsar ring 9. In addition, the ABS sensor 10 is configured to detect the rotation speed of an axle on the basis of a pulse signal generated by rotation relative to the pulsar ring 9 and output the detected rotation speed. The detecting portion of the ABS sensor 10 is, for example, a magnetic sensing element, such as a Hall element and a magnetic resistance element.

The configuration of the double row rolling elements 4 and 5 will be described below. As shown in FIG. 2, the rolling elements 4 in the wheel-side row are formed of tapered rollers. The rolling elements 4 are interposed between the first inner raceway surface 70a of the first inner ring member 70 and the outer raceway surface 3a of the outer member 3, and are rollably retained by a retainer 11 at equal intervals. A wheel-side seal member 12 is arranged at a position on the wheel-side of the rolling elements 4 and between the outer peripheral surface of the first inner ring member 70 and the inner peripheral surface of the outer member 3.

As shown in FIG. 2, the rolling elements 5 in the vehicle body-side row are formed of tapered rollers. The rolling elements 5 are interposed between the second inner raceway surface 71a of the second inner ring member 71 and the outer raceway surface 3b of the outer member 3, and are rollably retained by a retainer 13 at equal intervals. A vehicle body-side seal member 14 is arranged at a position on the vehicle body-side of the rolling elements 5 and between the outer peripheral surface of the second inner ring member 71 and the inner peripheral surface of the outer member 3.

The operation of the wheel bearing device 1 will be described below. The operation of the wheel bearing device 1 described in the present embodiment is similar to the operation of an existing wheel bearing device. That is, when torque is transmitted from an engine-side of the vehicle to the hub spindle 6 via the drive shaft, the constant velocity universal joint, and the like, the hub spindle 6 rotates together with the inner ring 7. Because the wheel is mounted on the hub spindle 6, torque from the engine-side is also transmitted to the wheel, and the wheel rotates together with the hub spindle 6. The rotation speed of the wheel is detected by the ABS sensor 10, and a signal that indicates the rotation speed as the output signal from the ABS sensor 10 is transmitted to a controller (not shown) of a brake system.

Figure 3A:
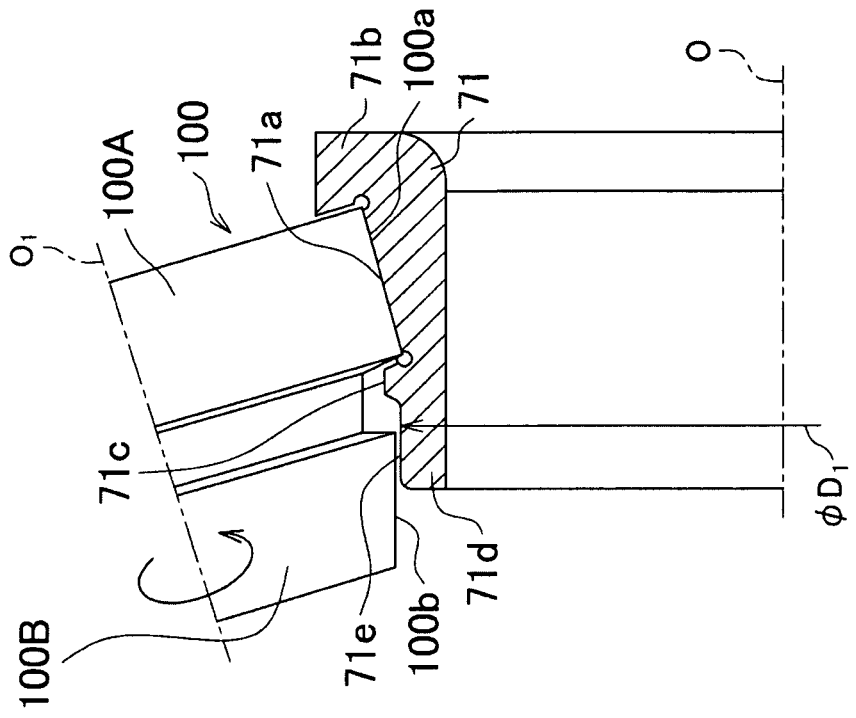
Figure 3B:
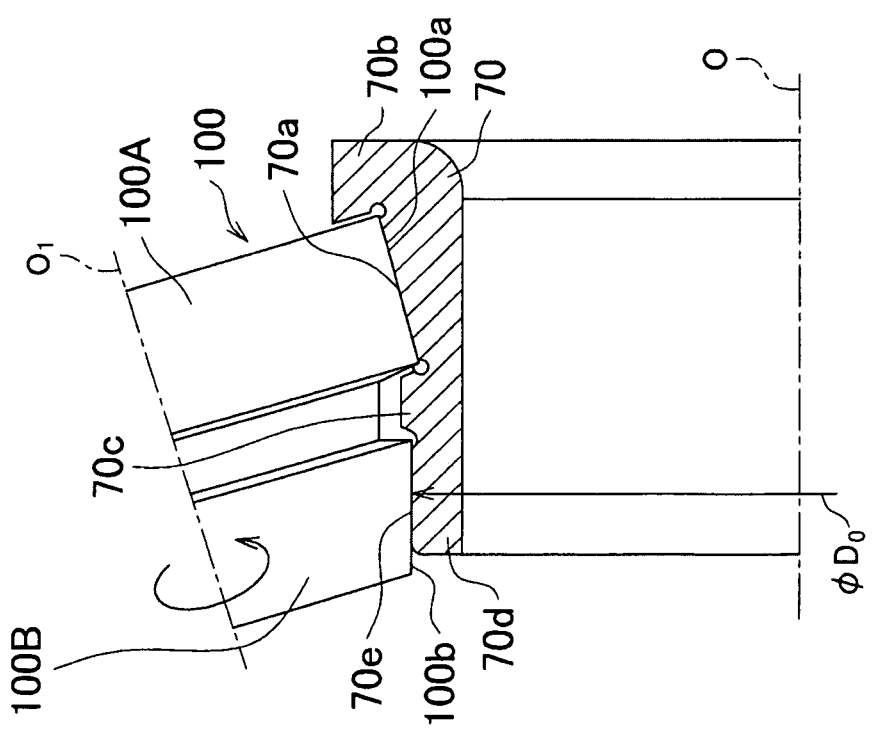

A manufacturing method for the inner ring 7 in the wheel bearing device 1 will be described below. A method for grinding a material for the inner ring 7 of the wheel bearing device 1 described in the present embodiment and manufacturing the inner ring 7 will be described with reference to FIG. 3A and FIG. 3B. FIG. 3A shows a grinding process for a first shaft member as a material for the first inner ring member 70. FIG. 3B shows a grinding process for a second shaft member as a material for the second inner ring member 71. Note that grinding means machining the surface of an object smooth irrespective of an amount by which a material is machined away.

The manufacturing method for the inner ring described in the present embodiment includes the process of "forming the first inner ring member" and the process of "forming the second inner ring member". Therefore, each of these processes will be described.

The process of forming the first inner ring member will be described below. In the process of forming the first inner ring member 70, as shown in FIG. 3A, a grinding wheel 100 which integrally has a first grinding surface 100a and a second grinding surface 100b is used. The first grinding surface 100a is used to grind the first inner raceway surface 70a of the first inner ring member 70. The second grinding surface 100b is used to grind the ring mounting surface 70e of the first inner ring member 70. A portion of the grinding wheel 100, which has the first grinding surface 100a corresponds to a first grinding wheel portion 100A. A portion of the grinding wheel 100, which has the second grinding surface 100b corresponds to a second grinding wheel portion 100B. The grinding wheel 100 is moved in a direction perpendicular to the axis $O_1$ while being rotated about the axis $O_1$. Thus, the first inner raceway surface 70a and ring mounting surface 70e of the first inner ring member 70 both are subjected to plunge grinding at the same time. The axis $O_1$ is inclined with respect to the central axis O of the first inner ring member 70 so as to be parallel to the first inner raceway surface 70a.

The process of forming the second inner ring member 71 will be described below. In the process of forming the second inner ring member 71, as shown in FIG. 3B, the grinding wheel 100 that is also used to form the first inner ring member 70 is used, and the grinding wheel 100 is moved in a direction perpendicular to the axis $O_1$ while being rotated about the axis $O_1$ to thereby grind the second inner raceway surface 71a of the second inner ring member 71. At this time, because the outside diameter $D_1$ of the wheel-side second end portion 71d of the second inner ring member 71 is smaller than the outside diameter $D_0$ of the ring mounting surface 70e in the first end portion 70d of the first inner ring member 70 ($D_0 > D_1$), the second grinding surface 100b of the grinding wheel 100 does not contact the outer peripheral surface 71e of the second end portion 71d of the second inner ring member 71.

Figure 4:
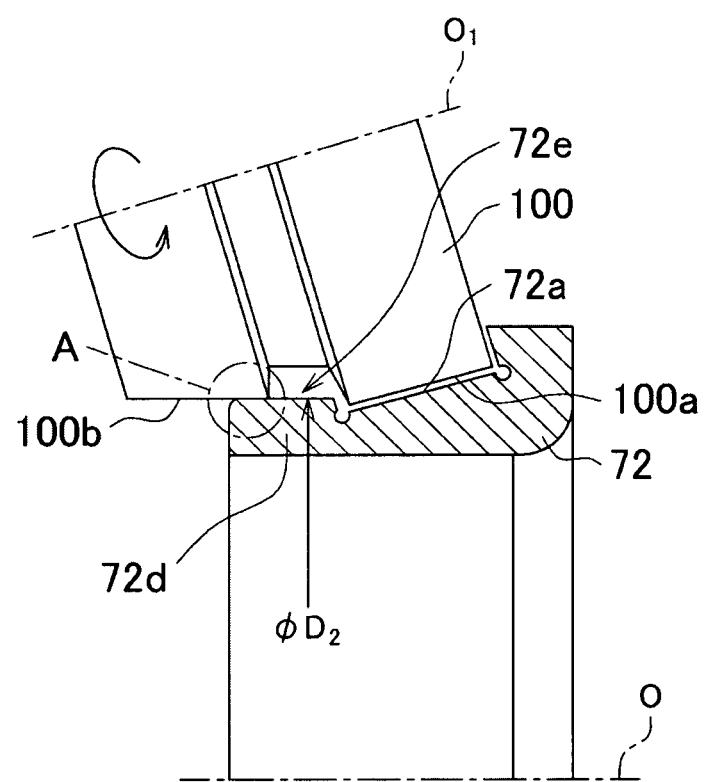
FIG. 4 is a sectional view that illustrates inconvenience when an inner ring of an existing wheel bearing device is subjected to grinding.

In contrast, as in the case of a second inner ring member 72 shown in FIG. 4, when the outside diameter $D_2$ of a portion of the outer peripheral surface 72e of a second end portion 72d (portion indicated by the sign A) is larger than or equal to the outside diameter $D_0$ of the first end portion 70d of the first inner ring member 70, the second grinding surface 100b of the grinding wheel interferes with the outer peripheral surface 72e of the second end portion 72d when the second inner raceway surface 72a is ground. Therefore, the second inner raceway surface 72a cannot be ground. If grinding is forcibly performed, only a portion of the second grinding surface 100b, which contacts the outer periphery of the second end portion 72d is ground, and a step is formed in the second grinding surface 100b.

Advantageous effects of the embodiment will be described below. According to the above-described embodiment, the following advantageous effects can be obtained.

Because the first inner raceway surface 70a and ring mounting surface 70e of the inner ring 7 can be ground in a single grinding process, a machining time is reduced. In addition, when the second inner raceway surface 71a is ground, the second grinding surface 100b does not contact the outer peripheral surface of the second end portion 71d. Therefore, the second grinding surface 100b is not damaged. In addition, because the first inner raceway surface 70a, the ring mounting surface 70e and the second inner raceway surface 71a can be ground with a single grinding wheel, it is possible to reduce the size of a grinding device and reduce the machining cost.

The inner ring of the wheel bearing device and the manufacturing method according to the embodiment of the invention have been described. However, the invention is not limited to the above embodiment. The invention may be implemented in various other embodiments within the scope of the invention. For example, the invention may be implemented in the following alternative embodiments.

(1) In the above embodiment, the pulsar ring 9 is mounted on the wheel-side inner ring member (first inner ring member 70). However, the invention is not limited to this configuration. An end portion having a ring mounting surface may be formed on the vehicle body-side inner ring member and then the pulsar ring may be mounted on the ring mounting surface.

(2) In the above embodiment, the rolling elements 4 and 5 both are tapered rollers. However, the invention is not limited to this configuration. Rolling elements may be formed of cylindrical rollers or steel balls.

(3) In the above embodiment, the first inner ring member 70 is formed first and then the second inner ring member 71 is formed. However, the invention is not limited to this configuration. Of course, the second inner ring member may be formed first and then the first inner ring member may be formed.

What is claimed is:

1. An inner ring of a wheel bearing device that rotatably supports an axle, comprising:
   a first inner ring member; and
   a second inner ring member,
   wherein the first inner ring member has a first inner raceway surface on which wheel-side rolling elements roll, and a ring mounting surface which is beside the first inner raceway surface in an axial direction and on which a rotation speed detecting ring for detecting a rotation speed of the axle is mounted, and the first inner ring member is ground by a grinding wheel having a first grinding wheel surface and a second grinding wheel surface for grinding the first inner raceway surface and the ring mounting surface, respectively, and wherein the second inner ring member is arranged along an axis of the first inner ring member and has a second inner raceway surface on which vehicle body-side rolling elements roll, and the second inner raceway surface is ground by the first grinding wheel surface of the grinding wheel, and wherein the second inner ring member is formed such that an outside axial width of a portion that radially faces the second grinding wheel surface in a state where the second inner raceway surface is ground by the first grinding wheel surface of the grinding wheel is smaller than an outside axial width of the ring mounting surface of the first inner ring member such that the second inner raceway surface does not contact an outer peripheral surface of the end portion, and an outside diameter of the end portion is smaller than an outside diameter of the ring mounting surface.

2. A wheel bearing device comprising:
the inner ring according to claim 1;
the wheel-side and vehicle body-side rolling elements that roll on the first and second inner raceway surfaces of the inner ring, respectively;
an outer member that has first and second outer raceway surfaces on which the wheel-side and vehicle body-side rolling elements roll, respectively;
the rotation speed detecting ring that is mounted on the ring mounting surface of the inner ring;
a sensor that is mounted on the outer member so as to face the rotation speed detecting ring and that detects a rotation speed of the axle; and
a hub spindle that has a flange portion on which a wheel is mounted, wherein the inner ring is fixed to an outer peripheral surface of the hub spindle.

3. The inner ring of a wheel bearing device according to claim 1, wherein a separating portion that is not parallel to the surface of the end portion or the second inner raceway surface separates the end portion from the second inner raceway surface.

4. The inner ring of a wheel bearing device according to claim 1, wherein a top and a bottom portion of the second inner ring member are arranged along a parallel axis relative to the ring mounting surface as a top and a bottom portion of the first inner ring member.

5. An inner ring of a wheel bearing device that rotatably supports an axle, comprising:
a first inner ring member; and
a second inner ring member,
wherein:
the first inner ring member has a first inner raceway surface on which wheel-side rolling elements roll, and a ring mounting surface which is beside the first inner raceway surface in an axial direction and on which a rotation speed detecting ring for detecting a rotation speed of the axle is configured to be mounted,
the second inner ring member is arranged along an axis of the first inner ring member and has (a) a second inner raceway surface on which vehicle body-side rolling elements roll and (b) an end portion (i) that is spaced apart from the second inner raceway surface toward a wheel-side in the axial direction and (ii) that directly contacts an end surface of the ring mounting surface, an outside axial width of the end portion is smaller than an outside axial width of the ring mounting surface, and
an outside diameter of the end portion is smaller than an outside diameter of the ring mounting surface.

6. A wheel bearing device comprising:
the inner ring according to claim 5;
the wheel-side and vehicle body-side rolling elements that roll on the first and second inner raceway surfaces of the inner ring, respectively;
an outer member that has first and second outer raceway surfaces on which the wheel-side and vehicle body-side rolling elements roll, respectively;
the rotation speed detecting ring that is mounted on the ring mounting surface of the inner ring;
a sensor that is mounted on the outer member so as to face the rotation speed detecting ring and that detects a rotation speed of the axle; and
a hub spindle that has a flange portion on which a wheel is mounted, wherein the inner ring is fixed to an outer peripheral surface of the hub spindle.

7. The inner ring of a wheel bearing device according to claim 5, wherein a separating portion that is not parallel to the surface of the end portion or the second inner raceway surface separates the end portion from the second inner raceway surface.

8. The inner ring of a wheel bearing device according to claim 5, wherein a top and a bottom portion of the first inner ring member and the second inner ring member are arranged along a parallel axis relative to the ring mounting surface of the first inner ring member.

9. A method of manufacturing of an inner ring of a wheel bearing device that rotatably supports an axle, wherein the inner ring has a first inner ring member and a second inner ring member, wherein the first inner ring member has a first inner raceway surface on which wheel-side rolling elements roll, and a ring mounting surface which is beside the first inner raceway surface in an axial direction and on which a rotation speed detecting ring for detecting a rotation speed of the axle is mounted, wherein the second inner ring member is arranged along an axis of the first inner ring member and has a second inner raceway surface on which vehicle body-side rolling elements roll, and wherein the second inner ring member is formed such that an outside axial width of a portion that radially faces the second grinding wheel surface in a state where the second inner raceway surface is ground by the first grinding wheel surface of the grinding wheel is smaller than an outside axial width of the ring mounting surface of the first inner ring member, and an outside diameter of the end portion is smaller than an outside diameter of the ring mounting surface the method comprising:
grinding both the first inner raceway surface and ring mounting surface of the first inner ring member using a grinding wheel having a first grinding wheel portion that grinds the first inner raceway surface and a second grinding wheel portion that rotates together with the first grinding wheel portion to grind the ring mounting surface; and
grinding the second inner raceway surface of the second inner ring member with the first grinding wheel portion using the grinding wheel.

* * * * *